US009262752B2

(12) United States Patent
Liu et al.

(10) Patent No.: US 9,262,752 B2
(45) Date of Patent: Feb. 16, 2016

(54) ATTENDEE SUGGESTION FOR EVENTS BASED ON PROFILE INFORMATION ON A SOCIAL NETWORKING SITE

(75) Inventors: Sean Yaoxing Liu, Sunnyvale, CA (US); Frances Bordwell Haugen, Mountain View, CA (US)

(73) Assignee: Google Inc., Mountain View, CA (US)

(*) Notice: Subject to any disclaimer, the term of this patent is extended or adjusted under 35 U.S.C. 154(b) by 231 days.

(21) Appl. No.: 13/572,536

(22) Filed: Aug. 10, 2012

(65) Prior Publication Data
US 2013/0332525 A1 Dec. 12, 2013

Related U.S. Application Data

(60) Provisional application No. 61/657,651, filed on Jun. 8, 2012.

(51) Int. Cl.
G06Q 10/10 (2012.01)
G06Q 50/00 (2012.01)
G06Q 50/30 (2012.01)

(52) U.S. Cl.
CPC .............. *G06Q 10/109* (2013.01); *G06Q 50/01* (2013.01); *G06Q 50/30* (2013.01)

(58) Field of Classification Search
None
See application file for complete search history.

(56) References Cited

U.S. PATENT DOCUMENTS

| | | | |
|---|---|---|---|
| 6,438,579 B1 * | 8/2002 | Hosken | 709/203 |
| 7,152,038 B2 | 12/2006 | Murashita et al. | |
| 7,937,287 B2 | 5/2011 | Gaia et al. | |
| 8,612,435 B2 * | 12/2013 | Sambrani et al. | 707/734 |
| 2006/0059141 A1 * | 3/2006 | Yonezawa | 707/5 |
| 2007/0066397 A1 * | 3/2007 | Nammi et al. | 463/42 |
| 2007/0233736 A1 | 10/2007 | Xiong et al. | |
| 2008/0052288 A1 * | 2/2008 | Flinn | G06F 17/30699 |
| 2008/0300937 A1 | 12/2008 | Allen et al. | |
| 2009/0248607 A1 * | 10/2009 | Eggink et al. | 706/54 |
| 2010/0088372 A1 | 4/2010 | Shridhar et al. | |
| 2010/0198648 A1 * | 8/2010 | Bank | G06Q 10/06311 705/7.19 |
| 2011/0145040 A1 * | 6/2011 | Zahn et al. | 705/7.33 |
| 2011/0252331 A1 * | 10/2011 | Kuhl et al. | 715/741 |
| 2012/0042013 A1 * | 2/2012 | Roman et al. | 709/204 |
| 2012/0072848 A1 | 3/2012 | Yonemoto | |
| 2012/0109836 A1 | 5/2012 | Chen et al. | |
| 2013/0232012 A1 * | 9/2013 | Yan et al. | 705/14.67 |
| 2013/0282810 A1 * | 10/2013 | Lessin et al. | 709/204 |

FOREIGN PATENT DOCUMENTS

WO   WO-2011/011398 A2   1/2011

* cited by examiner

*Primary Examiner* — Scott B Christensen
*Assistant Examiner* — Sean Concannon
(74) *Attorney, Agent, or Firm* — McDermott Will & Emery LLP (57) ABSTRACT

A system and machine-implemented method for suggesting a user for an event within a social networking site is provided. The method includes receiving a social suggestion indication from a first user of the social networking site and determining, using the one or more computing devices, an event associated with the first user. The method also includes accessing a data structure storing a plurality of user models comprising social information of users, and comparing, using the one or more computing devices, the event with the plurality of user models, to determine a second user model from the plurality of user models, based on a predetermined criteria. The method further includes identifying a second user associated with the second user model, and generating a user suggestion identifying the second user.

18 Claims, 8 Drawing Sheets

User's Calendar:
"Figure Sketching Meet Up Next Monday"
302

System:
"A, you'd probably like to go with C, who also enjoys figure sketching. She works at company X with you."
304

Accept suggestion and invite C to figure sketching
306

User:
"What should I do on Friday night?"
352

System:
"A, you probably want to go watch an action film. There is one showing at 8pm on Friday."
"You probably want to go with C. She lives near you."
354

Accept suggestion and invite C to go watch the action film.
356

ATTENDEE SUGGESTION FOR EVENTS BASED ON PROFILE INFORMATION ON A SOCIAL NETWORKING SITE

CROSS-REFERENCE TO RELATED APPLICATION

This application claims the benefit of U.S. Provisional Patent Application No. 61/657,651, filed Jun. 8, 2012, which is incorporated herein by reference in its entirety.

TECHNICAL FIELD

The present disclosure generally relates to suggesting attendees with whom a user may go to an event together, and more particularly to suggesting attendees based on profile information of users of a social networking site.

BACKGROUND

Social networking sites have allowed people to communicate with one another more easily and more efficiently than ever before. Through social networking sites, users may instantly share thoughts, music, videos, articles, websites and other items that may be of interest with other users with virtually no geographical barriers. Users may also conveniently receive comments from other users on their shared items. As long as users are connected to the Internet, social networking sites provide an effective means to connect with other users throughout the globe.

SUMMARY

The disclosed subject technology relates to a method executed on one or more computing devices for suggesting a user for an event within a social networking site. The method includes receiving a social suggestion indication from a first user of the social networking site, and determining, using the one or more computing devices, an event associated with the first user. The method also includes accessing a data structure storing a plurality of user models comprising social information of users, and comparing, using the one or more computing devices, the event with the plurality of user models, to determine a second user model from the plurality of user models, based on a predetermined criteria. The method further includes identifying a second user associated with the second user model, and generating a user suggestion identifying the second user.

The disclosed subject technology further relates to a system for suggesting an attendee to an event within a social networking site. The system includes a memory storing a data structure storing a plurality of user models including social information of users and storing executable instructions, and a processor. The processor is coupled to the memory and is configured to execute the stored executable instructions to receive a social suggestion indication from a first user of the social networking site. The processor is further configured to determine an event associated with the first user, access the data structure to determine the plurality of user models including a first user model associated with the first user, and compare the event with the plurality of user models, to determine multiple user models including a second user model from the plurality of user models, based on a predetermined criteria. The processor is further configured to determine the second user model from the determined multiple user models based on social affinity between the first user model and the determined multiple user models. The processor is yet further configured to identify a second user associated with the second user model, and generate an attendee suggestion identifying the second user as an attendee to the event.

The disclosed subject technology also relates to a machine-readable storage medium including machine-readable instructions for causing a processor to execute a method for suggesting an attendee to an event within a social networking site. The method includes receiving a social suggestion indication from a first user of the social networking site, determining an event associated with the first user, and accessing a data structure storing a plurality of user models including a first user model associated with the first user, where the plurality of user models comprises social information of users including profile information. The method also includes comparing the event and the first user model with the plurality of user models, to determine, from the plurality of user models, multiple user models including a second user model having social information satisfying a predetermined criteria. The method further includes determining the second user model, from the determined multiple user modes, based on shared profile information between the first and the determined multiple user models. The method yet further includes identifying a second user associated with the second user model, and generating a user suggestion identifying the second user as an attendee to the event.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

It may be a challenge for a user to find other users on a social networking site with similar interests to invite to an event. It may be time consuming for the user to find other users who are also interested in the event the user is attending, or it may be awkward for the user to reach out to the other users.

According to the various aspects of the subject technology, systems and methods for suggesting attendees for events based on profile information ("system") are provided. The system may gather various signals for a user from his or her social network profile to generate a user model. By comparing this user model with user models of other users, the system may suggest users who are likely to be interested in joining an event.

For example, a first user may enjoy attending a local meet up with other figure sketching artists and indicate on a social networking site that he wishes to attend the upcoming meeting. However, it may be awkward and inefficient for the first user to proactively find and ask if other users would like to attend the figure sketching with him. Instead, the system, simply by determining that the user is planning on attending the figure sketching event, may suggest other users on the site who also enjoy figure sketching. The system may not only suggest the other users to the first user, but also automatically ask the other users if they would like to attend the event with the first user. Since the system initiates the suggestion process, the awkwardness involved in personally asking other users can be removed, and the users may connect to other users more efficiently.

The system may also take social affinity into consideration when determining the other users to suggest. In the above example, if the system finds, among other users interested in figure sketching, that a second user works at the same firm as the first user while other users do not, then the site may first suggest the second to the first user.

In an aspect, the system may gather various information for each user to create a "user model". The user model may include, for example, information on what types of events the user likes to attend, user's activities on the social networking site, and any information that is public about the user. The public information may include any interest information that the user has entered in his or her profile. Such information may also be obtained from various services offered by the social networking site. Using the user model for each user, the system may look at which user models match the event a user wishes to attend, and make the suggestion to the user.

The system may also suggest to the user an event which he or she may be interested in attending. For example, if the system identifies an event in the local area that the user may wish to attend, the system may suggest this event to the user along with friends who may also be interested in attending. The system may also suggest an event in response to the user's request.

The phrase "social networking site" as used herein encompasses its plain and ordinary meaning, including, but not limited to, an online site, platform or service that focuses on building and the reflecting of social associations and interactions among users. These associations may be stored within a social graph at each social networking site. Users of social networking sites may create associations with one another. Such user associations may be defined on a user-to-user basis, or as a group of users associated through membership within a group. The social networking site may generate user models associated with users to store information about the users.

A "User Model" may be stored in the social networking site as a data structure or part of a data structure, and includes information gathered from various sources that are related to the user or information derived from such information. The sources from which the information may be gathered may be services or applications provided by or associated with the social networking site. Such information stored in the user model may include user-provided profile information such as, for example, name, date of birth, home address, telephone numbers, email addresses, spoken languages, family members, school and work information. The user model may also include interest information provided by the user such as, for example, activities, books, events, songs, movies, sports, celebrities, organizations, and religion(s) that the user likes or is interested in.

The phrase "friend" as used herein encompasses its plain and ordinary meaning. The phrase "friend" as used herein also encompasses the meaning as used in the social networking context, including, but not limited to, a user of a social networking site with which another user has an association.

Figure 1:
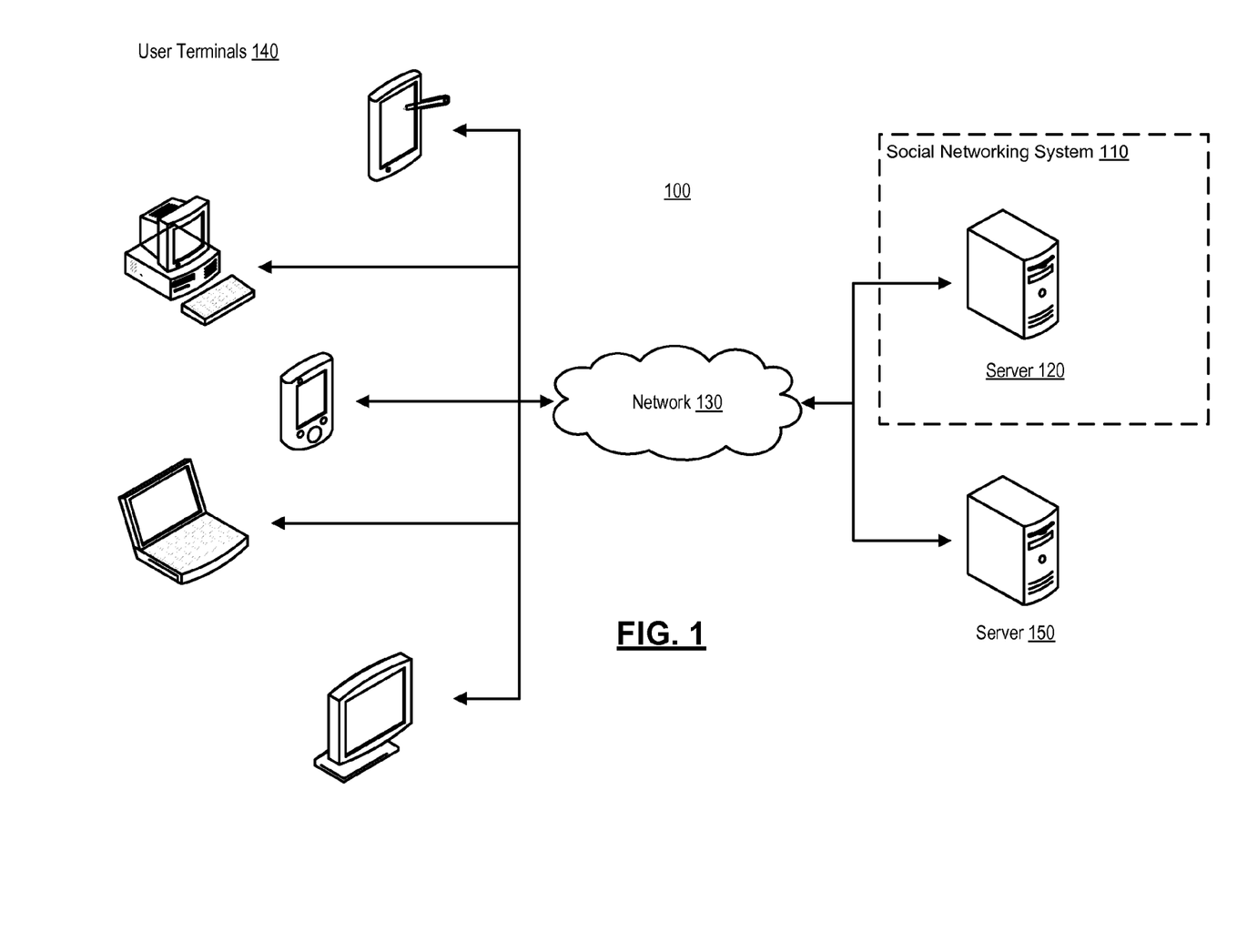
FIG. 1 illustrates an example architecture including a system for suggesting attendees for events based on profile information.

II. Example Architecture Including the System for Suggesting Attendees for Events Turning to the drawings, FIG. 1 illustrates an example architecture 100 including the system for suggesting attendees for events based on profile information. The architecture 100 may include a social networking system 110. The social networking system 110 may include a server 120. The server 120 may host all or parts of the social networking system 110, and the social networking system 110 may provide the functionalities and services for operating a social networking service. The present system for suggesting attendees for events may be hosted by the server 120, or the present system may be hosted on an independent server 150 in communication with the social networking system 110 through the network 130. Client computing devices 140 may be in communication with the social networking system 110 and the servers 120/150 through the network 130. The client computing devices 140 may be, for example, desktop computers, laptop computers, mobile devices (e.g., a smartphone, tablet computer, or PDA), set top boxes (e.g., for a television with one or more processors embedded therein or coupled thereto), video game consoles, or any other devices having appropriate processor, memory, and communications capabilities. The client computing devices 140 may be computing devices, and any server or system (e.g., servers 120, server 150 or social networking system 110) may be run on one or more computing devices, or may represent more than one computing device working together to perform the actions of a server computer (e.g., cloud computing).

The network 130 may be, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

III. Example System for Suggesting Attendees for Events

Figure 2:
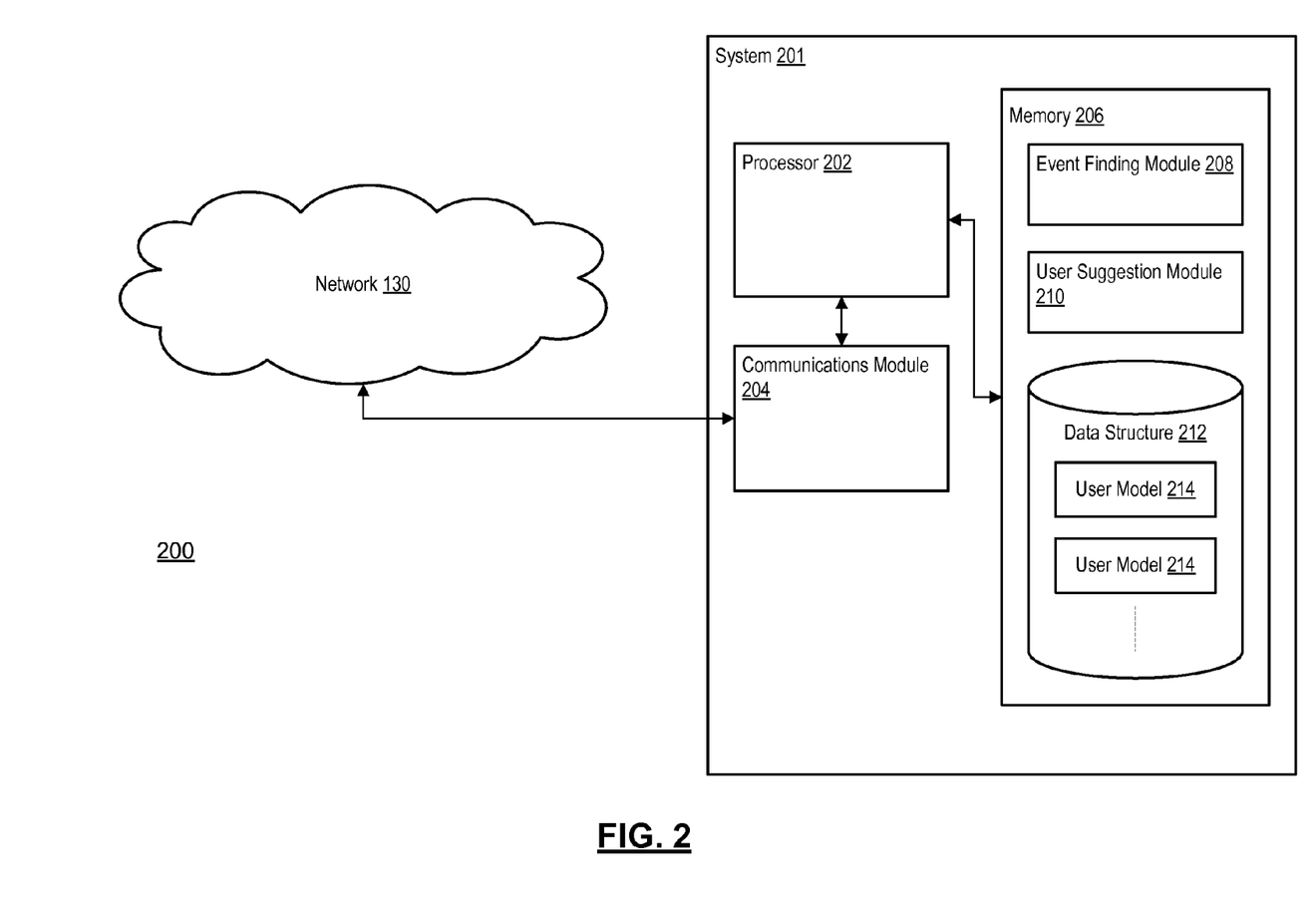
FIG. 2 is a block diagram illustrating an example system for suggesting attendees for events based on profile information.

FIG. 2 is a block diagram 200 illustrating an example system 201 for suggesting attendees for events according to certain aspects of the disclosure. The system 201, may be hosted, for example, on the server 120 or server 150. The system 201 may include a processor 202, a communications module 204, and a memory 206. The communications module 204 may be coupled to the processor 202, and communication between the system 201 and a social networking system (e.g., social networking system 110) or client computing devices (e.g., client computing devices 140) may be done using the communications module 204.

The processor 202 may be configured to execute instructions, such as instructions physically coded into the processor 202, instructions received from software in memory 206, or a combination of both. For example, the processor 202 may execute instructions to receive a social suggestion indication from a first user of the social networking service provided by the social networking system 110. The social suggestion indication may be, for example, a determination by the system 201 that the first user is planning on attending a event. In an aspect, the social suggestion indication may be a request by the first user to suggest an event that he or she may attend. The software in the memory 206 may include components such as the event finding module 208 and the user suggestion module 210. The event finding module 208 may include instructions for identifying an event based on a user's request to suggest an event. The user suggestion module 210 may include instructions for generating suggestion of other users with whom a user may attend an event. The modules 208 and 210 may also be implemented as independent hardware modules in communication with the processor 202. Memory 206 may also include a data structure 212 which may store user models 214. The modules 208 and 210 may base their results on the user models 214. The data structure 212 may also be stored in an external storage means outside of the memory 206 such as, for example, a separate database or a cloud-based storage in communication with the processor 202. The user models 214 may be generated by the system 201 to include information about the users of the social networking service which the users have authorized to be used by the system 201, and/or any data derived from such information. The user models 214 will be described in more detail below with respect to FIG. 7.

The processor 202 may also execute instructions to access the data structure 212 storing the user models 214 of the users of the social networking service, and identify the user models of the various users, including the first user. An event associated with the first user may also be identified, such as by using the event finding module 208, or from the social suggestion indication. The identified event may be compared with the user models 214 of the other users of the social networking service based on a predetermined criteria. The criteria used for comparing the user models 214 may be, for example, whether the users of the compared user models have similar profiles, have similar interests, attended similar events in the past, have searched for similar keywords before, and whether the users' respective friends share similar interests. Other criteria may also used. In the case where the social suggestion indication is a determination by the system 201 that the first user is planning on attending an event, then the criteria may also include whether the compared user model suggests that the associated user is likely to enjoy attending the event. When one or more user models 214 satisfying the criteria are found, the processor may execute instructions to identify second users associated with the found user models and generate a suggestion indicating the identified second users as suggested users to attend the event together. The suggestion may also indicate the first user and the event.

The processor 202 may also execute instructions for determining the social affinity between the first user and the identified second users. Social affinity may be determined by comparing the user models of two users. The two compared users may be determined to have higher social affinity if the user models indicate, for example, that the two users live close together, work at the same place, or have the same telephone area code. If multiple second users are identified, preference may be given to the users having higher social affinity with the first user and only the top predetermined number of such users may be indicated in the generated suggestion.

The generated suggestion may first be communicated to the first user. If the first user accepts the suggestion, the processor 202 may execute instructions for communicating the suggestion to the second users indicated in the suggestion. In another aspect, the generated suggestion may be first communicated to the second users indicated in the suggestion. If the second users accept the suggestion, the suggestion may be communicated to the first user, indicating only the second users who have accepted the suggestion.

Figure 3A:
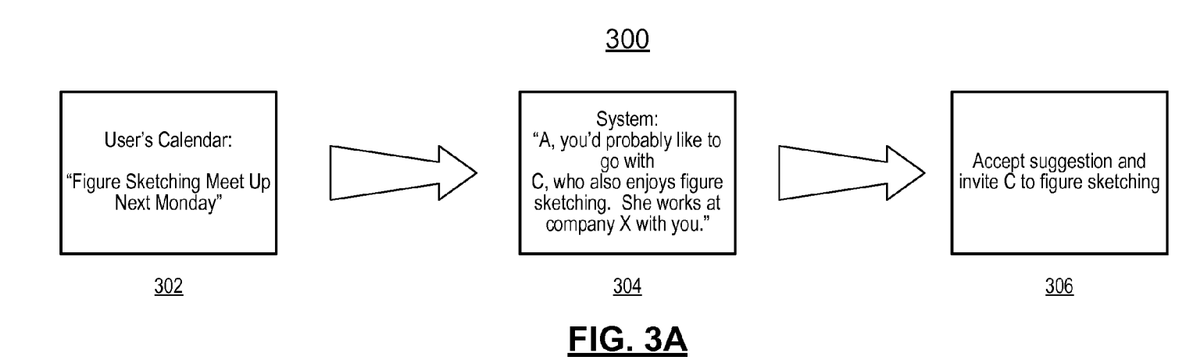
FIGS. 3A and 3B illustrate examples of overviews of a user's experience using the system of FIG. 2.
Figure 3B:
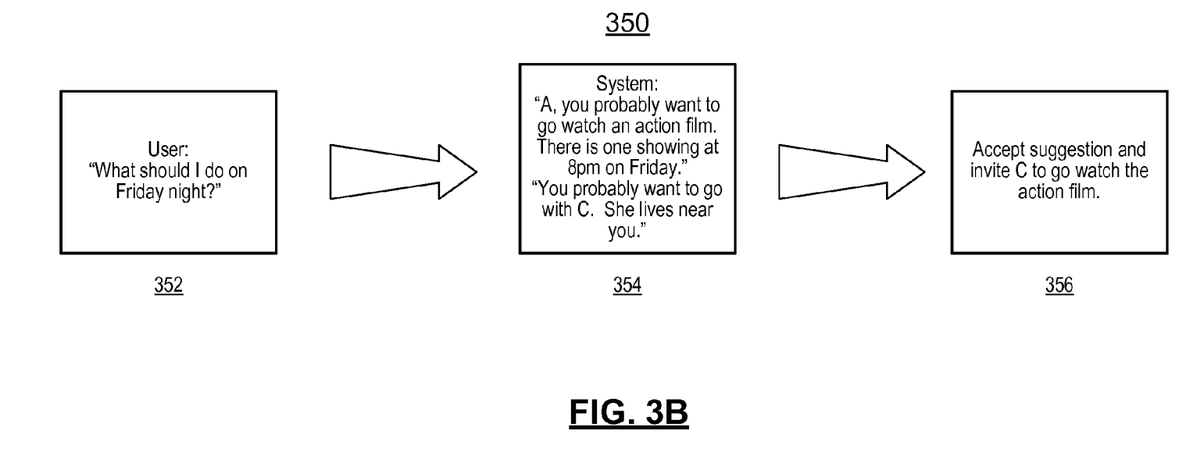

IV. Example Overviews of a User's Experience Using a System for Suggesting Attendees for Events FIGS. 3A and 3B illustrate examples of overviews of a user's experience using a system for suggesting attendees for events (e.g., system 201). More particularly, FIG. 3A illustrates an overview 300 of an example user's experience using the system to receive suggestions for a participant to an event. First, user A may indicate on his calendar linked to the social networking service (e.g., a social networking service hosted by the social networking system 110) that he is attending a figure sketching event next Monday (302). The system may monitor user A's calendar and determine that user A is attending the figure sketching event next week.

After determining that user A is attending the figure sketching event, the system may generate a suggestion and suggest to user A that user C may be a good person to go together to the figure sketching event (304). For example, the system may send a notification to user A which may read: "A, you'd probably like to go with C, who also enjoys figure sketching. She works at company X with you." The system may generate the suggestion using, for example, the user suggestion module 210 containing user suggestion instructions. The operation of the system using the user suggestion module 210 will be described in detail below with reference to FIG. 4.

Next, user A may either accept or decline the suggestion. If user A accepts the suggestion, the system may invite user C to attend the figure sketching event with user A (306). Therefore, user A may efficiently find a person with whom to attend his figure sketching event, since the awkwardness and inefficiency associated with finding and asking a user out by himself is removed from the process. In an aspect, the system may first send the notification to user C, and only notify user A of the suggestion if user C accepts.

FIG. 3B illustrates an overview 350 of an example user's experience using the system for suggesting attendees for events (e.g., system 201) to receive suggestions for an event and a participant. User A in the above example, instead of entering in his calendar that he is attending the figure sketching event, may request to the system for a suggestion for an activity that he may want to engage in (352). For example, the system may provide a user interface (UI) by which user A may indicate a date and time at which he wishes to engage in an activity and request a suggestion. The activity may be, for example, an event that user A may attend. The UI by which the user A may request a suggestion may be, for example, a button which reads "What should I do on Friday night?" In response, the system may analyze the user model of user A and events or other activities available at the designated time to determine a suggested activity. For example, if the user model contains information indicating that user A enjoys watching action films, the system may determine an action film showing as the suggested activity, provided that one is available at the indicated time. In an aspect, the system may perform the analysis, for example, using the event finding module 208 containing instructions which may be executed by the processor 202. The system may also analyze the user models of other users to determine users who may also be interested in attending the action film showing. The system may also determine whether the determined user has social affinity with user A. In an aspect, the analysis and the determination of a suggested user may be performed using the user suggestion module 210 including the user suggestion instructions executable by the processor 202. The operation of the system using the user suggestion module 210 will be described in detail below with reference to FIG. 4.

User C may be determined to be likely to enjoy action films and have close social affinity with user A. Next, the system may send a notification to user A which may read "A, you probably want to go watch an action film. There is one showing at 8 pm on Friday. You probably want to go with C. She lives near you." (354). User A may accept this suggestion and invite C to go watch the action film together (356). Therefore, user A may efficiently find an activity that he is likely to enjoy, and as with the example described with respect to FIG. 3B, he may also efficiently find a person with whom to watch the action film together, since the awkwardness and inefficiency associated with finding and asking a user out by himself is removed from the process. In an aspect, the system may first send the notification to user C, and only notify user A of the suggestion if user C accepts.

Figure 4:
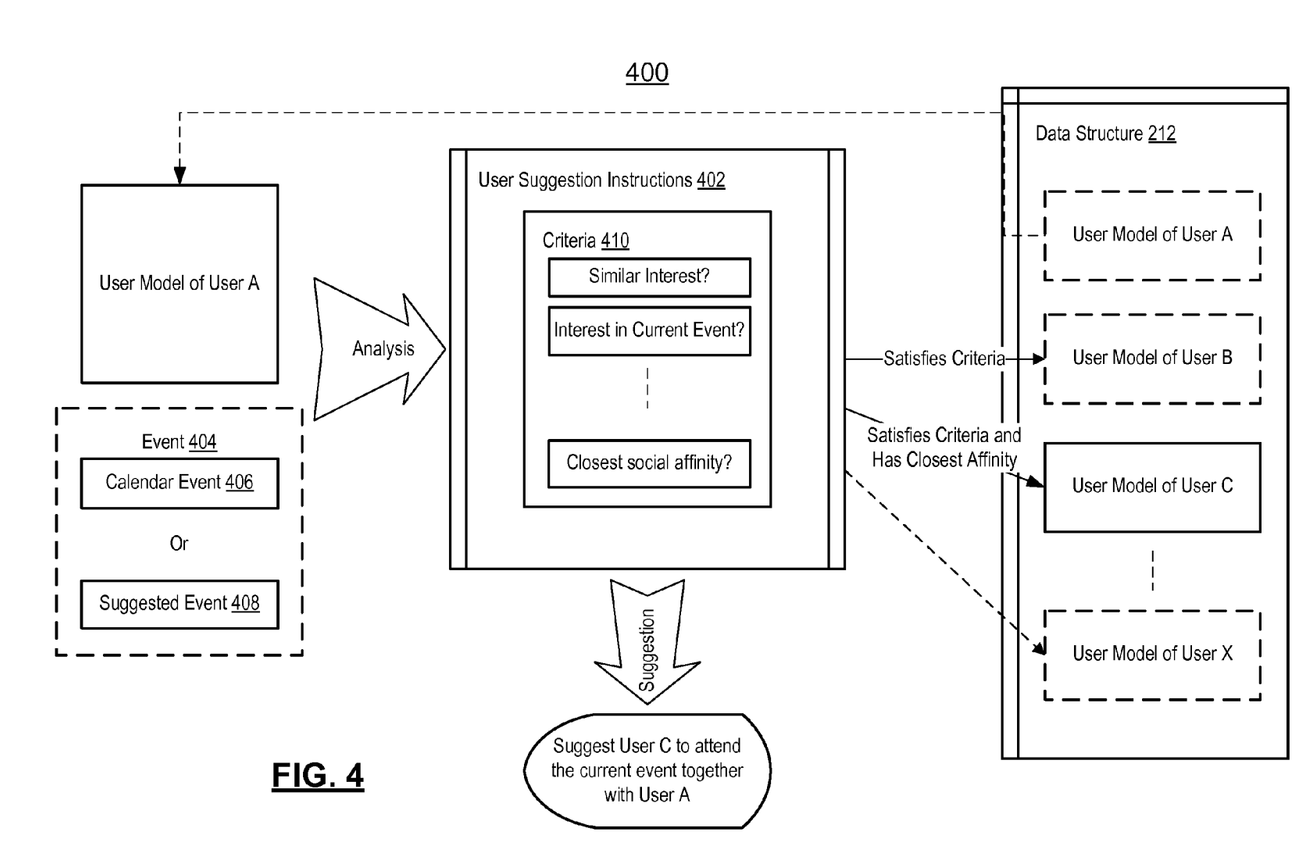
FIG. 4 is a detailed schematic diagram illustrating an example operation of the user suggestion module of FIG. 2.

V. Example Description of the Operation of the System for Suggesting Attendees for Events Detailed description of operations of a system for suggesting attendees for events (e.g., system 201) using a user suggestion module (e.g., user suggestion module 210) follows with reference to FIG. 4. FIG. 4 is a detailed schematic diagram 400 illustrating an example operation of the user suggestion module containing the user suggestion instructions 402 which a processor (e.g., processor 202) may execute. Previously, the system may have generated user models (e.g., user models 214), each user model including social information of a user of the networking service (e.g., social networking service hosted by the social networking system 110), such as, for example, the user's profile, interests, and prior event attendance records. The system may have generated such user models for some or all of the users of the social networking service, including user A. The user models may be stored in a data structure (e.g., data structure 212).

Using user A's user model and the description and time of an event 404, the processor may execute the user suggestion instructions 402 to search the user models to find other users for suggestion who may be interested in attending the event with user A. The event 404 may be the calendar event 406 which the user A may have entered in his calendar, or the suggested event 408, which the system may have identified in response to a request from user A. In finding the users to suggest, the user suggestion instructions 402 may cause the processor to analyze the user models and determine whether a user may find the event 404 interesting. During the analysis, the instructions 402 may cause the processor to consider various criteria 410 such as whether the user model being analyzed contains interest information which may suggest that the user may be interested in the event 404. For example, if the user model being analyzed includes event attendance records showing that the user has attended events similar to the event 404 in the past, the instructions 402 may cause the processor to determine that the user may find event 404 interesting. Whether the user shares similar interest information with user A may also be considered in the analysis.

As a result of the analysis, Users B and C may be determined to be likely to enjoy the event 404. However, the user suggestion instructions 402 may also cause the processor to determine the social affinity of the users B and C with user A. Social affinity may be determined by comparing the user models of the two users. Specifically, the instructions 402 may cause the processor to determine the likelihood that the two users being compared are socially related, for example, that they are friends, colleagues, or family members. For example, if the users share qualities such as living close together, working at the same place, having the same telephone area code, or having one or more common friend, the users may be determined to have close social affinity. The more qualities the two users share, the higher the social affinity is that is assigned to the users. User C may be determined to have closer social affinity with user A, and the instructions 402 may cause the processor to suggest user C to user A.

VI. Example Processes for Suggesting Attendees for Events

Figure 5:
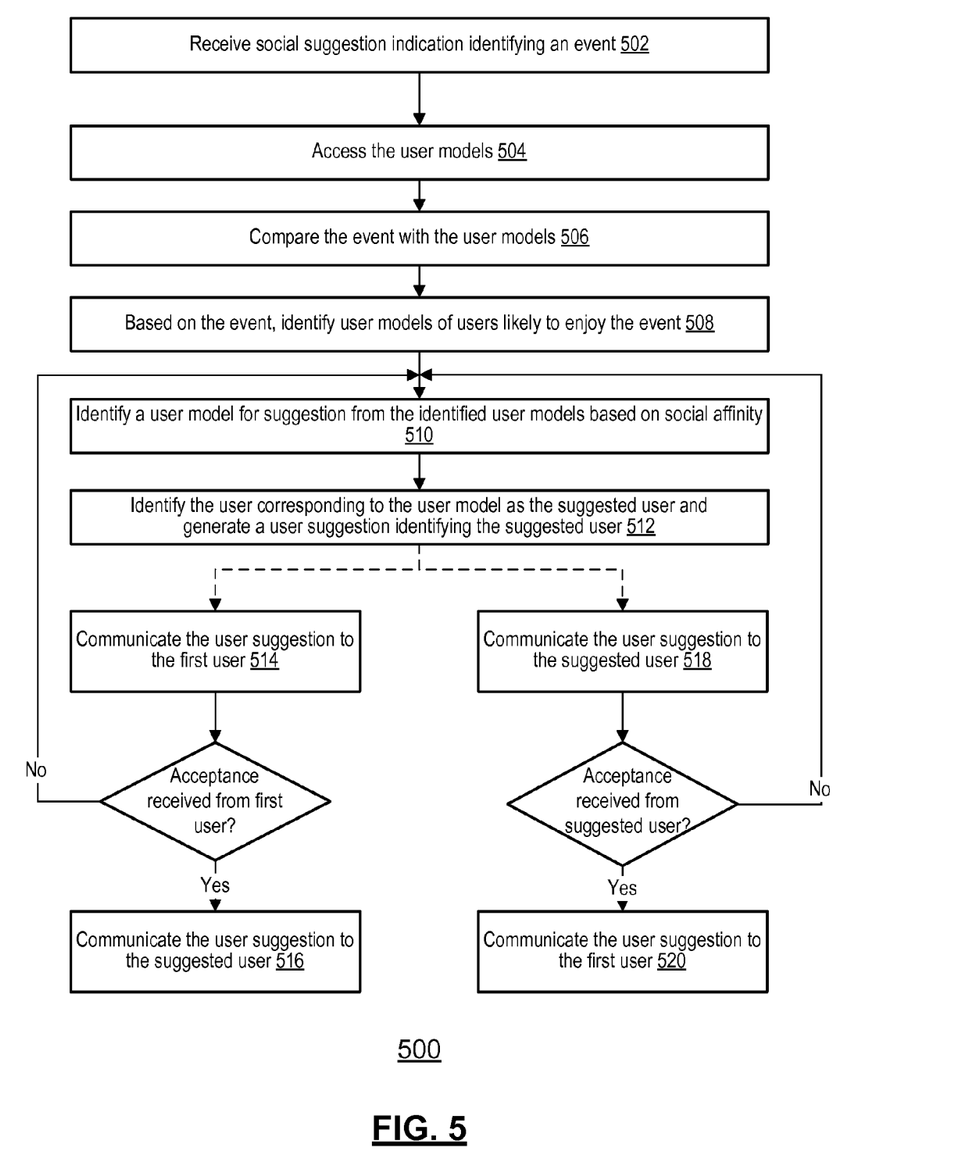
FIG. 5 illustrates an example flow diagram of the process described with reference to FIG. 3A.

FIG. 5 illustrates an example flow diagram 500 of the process described with reference to FIG. 3A. The process of FIG. 5 may be performed, for example, by the system 201. A social suggestion indication identifying an event from a first user may be received (502). The social suggestion indication may be a calendar entry of a user for plans to attend an event. For example, the user may add to his calendar that he is planning on attending a figure sketching event. In another example, the system may determine from a posting on the social networking service that the user is attending a figure sketching event. The entry may be determined as an indication of suggestion for a user to attend the event together. The social suggestion indication is not limited to calendar entries, and may be other indications of plans for the user to attend an event such as, for example, reminders, comments, and postings on the social networking service and/or other services/applications accessible by the social networking service that discusses plans to attend an event. After the social suggestion indication identifying an event is received, user models (e.g., user models 214) are accessed (504). For example, the user models may be stored in data structure (e.g., data structure 212) of a memory (e.g., memory 206), and the system may query the data structure for access to the user models. Next, the event is compared with the user models 214 (506). For example, the system extracts the event information such as the type of the event, location and time, and compares such information with each of the accessed user models 214. Based on the event and the information contained in the user models, the user models associated with users who are likely to enjoy the event are identified (508). For example, the system identifies user models based on whether the user models satisfy various predetermined criteria, such as the criteria 410 discussed above.

Among the identified user models in step 508, one or more user models containing social information indicating close social affinity with the first user is identified (510). For example, the system determines the social affinity based on various factors indicating how likely the compared users may be socially related. Such factors may include, for example, geographic proximity, same telephone area code, same work place, same school, and mutual friends. Next, the user or users of the identified one or more user models indicating close social affinity are identified as the suggested users, and a user suggestion identifying the suggested users is generated (512). For example, the user models may each include a user identifier for identifying the user associated each user model. For each of the user models identified as indicating close social affinity in step 510, the system identifies its corresponding user based on the user identifier. The user suggestion may be a message directed to the first user associated with the social suggestion indication, and may prompt the user to invite the suggested users to the event. In an aspect, users may be suggested without determining social affinity.

In one aspect, the user suggestion may be first communicated to the first user (514). For example, the first user may be presented with the user suggestion, which prompts the first user to invite the suggested user to the event. In another example, the system may communicate the user suggestion to the user through a messaging service provided by the social networking system. If the first user accepts the user suggestion, then the user suggestion is also communicated to the suggested user (516). The user suggestion communicated to the suggested user may also identify the first user and the event. For example, if the first user responds to the user suggestion by accepting the suggestion (e.g., clicking on an "invite" button provided with the user suggestion), then the suggested user may receive a message from the social networking system indicating to the suggested user that the first user has invited the suggested user to the event and prompting whether the suggested user would like to accept the invitation. In another example, if the system receives an accept indication from the first user in response to the user suggestion (first user clicked on an "invite" or "accept" button), then the system generates a message prompting whether the suggested user wishes to accept the first user's invitation, and sends the message to the suggested user using the messaging service of the social networking system.

In another aspect, after step 512, the user suggestion may be first communicated to the suggested user (518). The user suggestion communicated to the suggested user may also identify the first user and the event. For example, the suggested user may receive a message indicating that the first user is planning on attending the event, and prompting the suggested user whether the suggested user would like to ask the first user if the suggested user may attend the event with the first user. In another example, the system generates a message prompting the suggested user whether the suggested user would like to ask the first user whether the suggested user may attend the event with the first user, and sends the message to the suggested user through a messaging service of the social networking system. If the suggested user accepts the user suggestion, the user suggestion is also communicated to the first user (520). For example, the first user receives a message indicating that the second user would like to attend the event together with the first user and prompting whether the first user would also like to attend the event with the suggested user. In another example, if the suggested user indicates that he or she would like to ask the first user to attend the event together, the system generates a message prompting the first user whether the first user would also like to attend the event with the suggested user, and sends the message to the first user through a message service of the social networking system.

Figure 6:
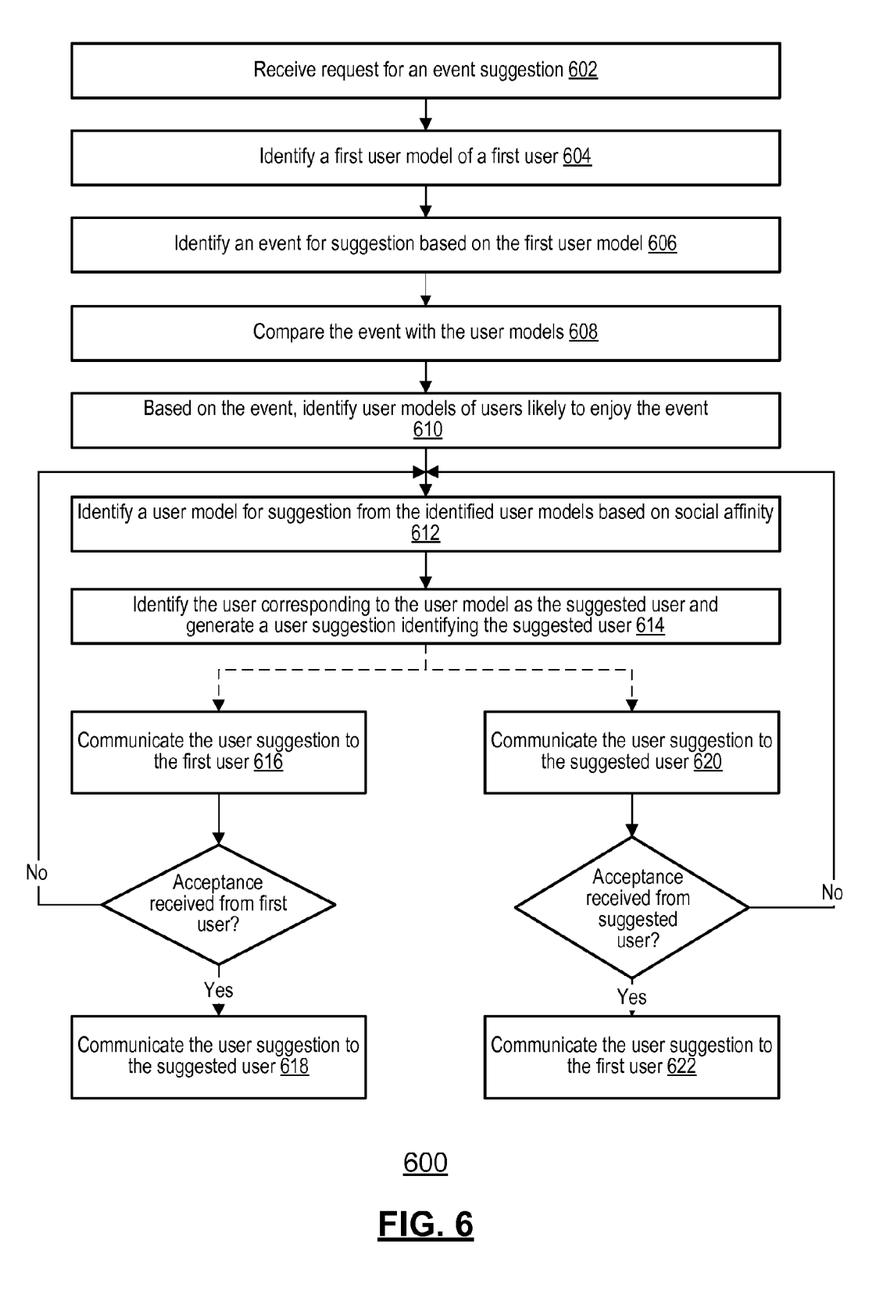
FIG. 6 illustrates an example flow diagram of the process described with reference to FIG. 3B.

FIG. 6 illustrates an example flow diagram 600 of the process described with reference to FIG. 3B. A request for an event suggestion is received from the first user (602). The request may be, for example, a first user clicking on a button displayed on a page of a social networking service (e.g., social networking service provided by the social networking system 110). In another example, the system may determine that the user is requesting an event suggestion through an API of the social networking system for receiving requests from users. In response, the user model of the first user is identified (604), and an event for suggestion is identified based on the first user model (606). For example, the request may include a time frame, indicating that the first user is requesting an event being held during that time frame. The system identifies the event for suggestion by analyzing the first user model and events available during the indicated time frame. The information on available events may be obtained from various sources, such as, for example, internet search engines, local event listings services, users' calendars, or other online or off-line services in communication with a social networking system (e.g., social networking system 110). By comparing the available events against the information available from the user model, an event that the first user will likely enjoy attending is determined. In an aspect, the suggested event may also be identified based on the user models of friends of the first user or persons determined to be socially related to the first user.

The description for the remaining of steps 608-622 shown in FIG. 6 may be similar to that for steps 506-520 of FIG. 5, and will not be repeated here.

VII. Example User Model of the System for Suggesting Attendees for Events

Figure 7:
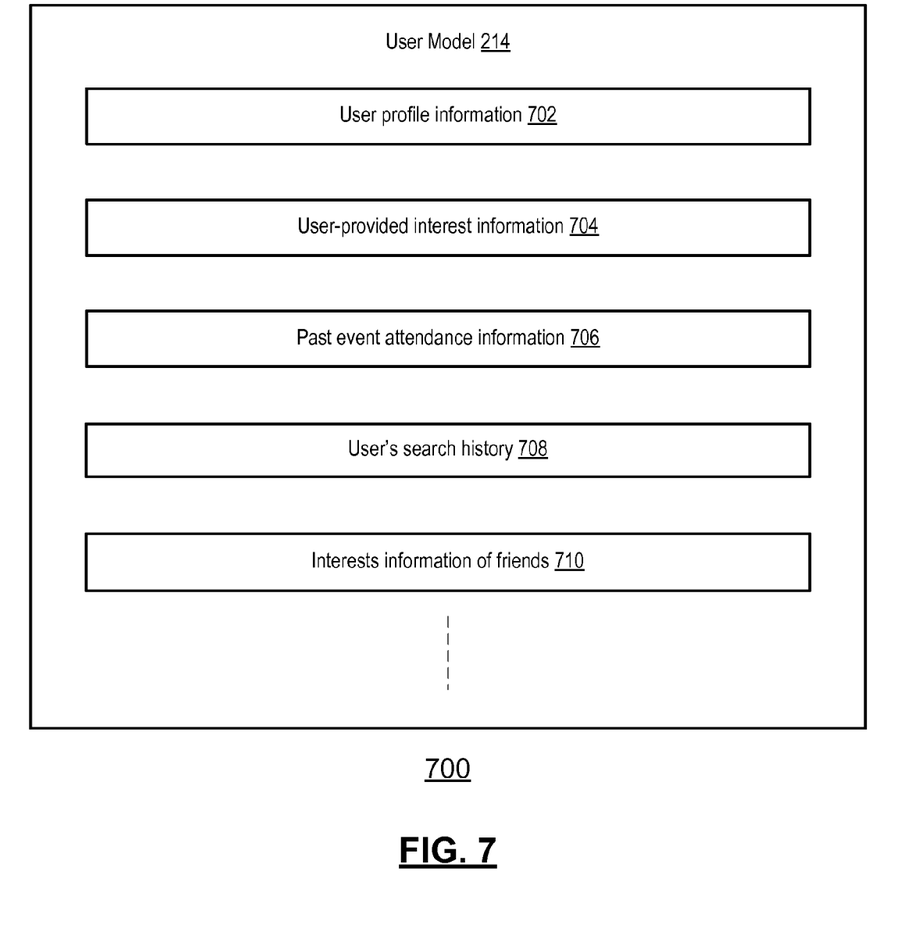
FIG. 7 is a block diagram of an example user model.

FIG. 7 is a block diagram of an example user model 214 of FIG. 2 according to certain aspects of the disclosure. The user model 214 may include various information received from the user associated with the user model, information gathered from various sources that are related to the user, or information derived from such information. The sources from which the information may be gathered may be services or applications provided by or associated with the social networking system 110. Such services or applications may be, for example, search engines, calendar applications, email applications, word processing applications, spread sheet applications, reader applications, video sharing services, photo sharing services, gaming applications, map applications, and blog services. The terms "applications" and "services" as used here may be used interchangeably, and may refer to on-line services/applications or off-line services/applications.

The user model 214 may include user profile information 702 which may be user-provided profile information such as, for example, name, date of birth, home address, telephone numbers, email addresses, spoken languages, family members, school and work information. The user model 214 may also include user-provided interest information 704. Information 704 may include interest information provided by the user such as, for example, activities, books, events, songs, movies, sports, celebrities, organizations, and religion(s) that the user likes or is interested in. The user model 214 may also include information such as past event attendance information 706, and user's search history 708. The user model 214 may further include interest information of user's friends 710. Other types of information may also be included in the user model 214. In an aspect, all of the foregoing information may be gathered and used by the system 201 upon authorization from the user. The user may be able to opt out of providing any of the foregoing information or prevent the system 201 from using such information in any way. Assuming the user has granted authorization, the foregoing information 702-710 may be used in determining an event to suggest to a user, or in determining a suggested user to attend an event together.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject technology can be implemented as sub-parts of a larger program while remaining distinct software aspects of the subject technology. In some implementations, multiple software aspects can also be implemented as separate programs. Finally, any combination of separate programs that together implement a software aspect described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

VIII. Example Electronic System Implementing the Subject Technology

Figure 8:
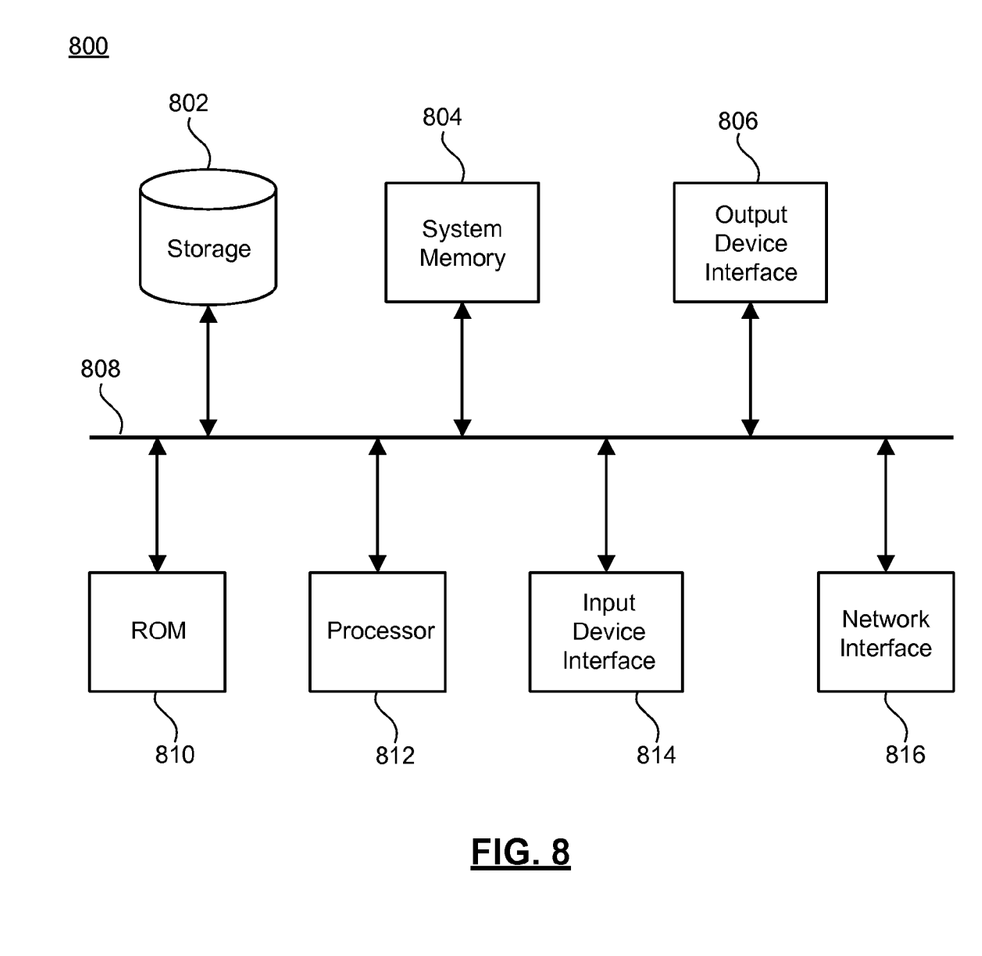
FIG. 8 is a conceptual diagram illustrating an example electronic system with which some implementations of the subject technology can be implemented.

FIG. 8 conceptually illustrates an electronic system with which some implementations of the subject technology are implemented. Electronic system 800 can be a computer, phone, PDA, or any other sort of electronic device. Such an electronic system includes various types of computer-readable media and interfaces for various other types of computer-readable media. Electronic system 800 includes a bus 808, processing unit(s) 812, a system memory 804, a read-only memory (ROM) 810, a permanent storage device 802, an input device interface 814, an output device interface 806, and a network interface 816.

Bus 808 collectively represents all system, peripheral, and chipset buses that communicatively connect the numerous internal devices of electronic system 800. For instance, bus 808 communicatively connects processing unit(s) 812 with ROM 810, system memory 804, and permanent storage device 802.

From these various memory units, processing unit(s) 812 retrieves instructions to execute and data to process in order to execute the processes of the subject technology. The processing unit(s) can be a single processor or a multi-core processor in different implementations.

ROM 810 stores static data and instructions that are needed by processing unit(s) 812 and other modules of the electronic system. Permanent storage device 802, on the other hand, is a read-and-write memory device. This device is a non-volatile memory unit that stores instructions and data even when electronic system 800 is off. Some implementations of the subject disclosure use a mass-storage device (such as a magnetic or optical disk and its corresponding disk drive) as permanent storage device 802.

Other implementations use a removable storage device (such as a floppy disk, flash drive, and its corresponding disk drive) as permanent storage device 802. Like permanent storage device 802, system memory 804 is a read-and-write memory device. However, unlike storage device 802, system memory 804 is a volatile read-and-write memory, such as a random access memory. System memory 804 stores some of the instructions and data that the processor needs at runtime. In some implementations, the processes of the subject technology are stored in system memory 804, permanent storage device 802, and/or ROM 810. For example, the various memory units include instructions for suggesting attendees for events in accordance with some implementations. From these various memory units, processing unit(s) 812 retrieves instructions to execute and data to process in order to execute the processes of some implementations.

Bus 808 also connects to input and output device interfaces 814 and 806. Input device interface 814 enables the user to communicate information and select commands to the electronic system. Input devices used with input device interface 814 include, for example, alphanumeric keyboards and pointing devices (also called "cursor control devices"). Output device interface 806 enables, for example, the display of images generated by the electronic system 800. Output devices used with output device interface 806 include, for example, printers and display devices, such as cathode ray tubes (CRT) or liquid crystal displays (LCD). Some implementations include devices such as a touchscreen that functions as both input and output devices.

Finally, as shown in FIG. 8, bus 808 also couples electronic system 800 to a network (not shown) through a network interface 816. In this manner, the computer can be a part of a network of computers (such as a local area network ("LAN"), a wide area network ("WAN"), or an Intranet, or a network of networks, such as the Internet. Any or all components of electronic system 800 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD- R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject technology described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject technology described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject technology described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" which may be used herein is used to mean "serving as an example or illustration." Any aspect or design which may be described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A method executed on one or more computing devices for suggesting a user for an event within a social networking site, the method comprising:

receiving a social suggestion indication comprising an event suggestion request from a first user of the social networking site;

determining, using the one or more computing devices, an event associated with the first user, the event having a location and time;

accessing a data structure storing a plurality of user models comprising social information of users, each user model corresponding to a user;

comparing, using the one or more computing devices, the event with the plurality of user models to determine multiple user models from the plurality of user models, based on a predetermined criteria;

determining a second user model from the determined multiple user models based on social affinity between a first user model corresponding with the first user and the determined multiple user models;

identifying a second user associated with the second user model;

automatically generating, without user intervention by the first or second user, a user suggestion that the first user and the identified second user both attend the event;

sending the user suggestion to the identified second user without notifying the first user; and sending the user suggestion to the first user only if the second user accepts the user suggestion.

2. The method of claim 1, wherein the comparing comprises determining the second user model having social information satisfying the predetermined criteria based on the event.

3. The method of claim 1, wherein:
the social information comprises user profile information; and
the determining the second user model from the determined multiple user models based on social affinity comprises determining the second user model based on shared profile information between the first and the determined user models.

4. The method of claim 1, further comprising accessing the data structure to identify a first user model associated with the first user, wherein:
the determining the event comprises determining the event from the social suggestion indication, and
the comparing comprises comparing the event and the first user model with the plurality of user models, to determine the second user model.

5. The method of claim 1, wherein the social suggestion indication comprises an event suggestion request;
the method further comprising accessing the data structure to identify a first user model associated with the first user; and
wherein the determining the event comprises determining, in response to the event suggestion request, the event based on the first user model.

6. The method of claim 1, wherein:
the social suggestion indication comprises an event suggestion request;
the method further comprising accessing the data structure to determine a third user model associated with a third user, the third user associated with the social networking site and socially related to the first user; and
the determining the event comprises determining, in response to the event suggestion request, the event based on the third user model.

7. The method of claim 1, further comprising:
receiving an accept input from the first user in response to the user suggestion; and communicating the acceptance of the user suggestion by the first user to the second user.

8. The method of claim 1, wherein the social information comprises interest information and event attendance information of the users.

9. The method of claim 1, further comprising:
identifying multiple second users associated with the second user model and having a high social affinity with the first user; and
generating the user suggestion that the first user and a predetermined number of the identified second users with the highest affinity with the first user attend the event.

10. A system for suggesting an attendee to an event within a social networking site, the system comprising:
a memory storing a data structure storing a plurality of user models comprising social information of users, each user model corresponding to a user, and storing executable instructions; and
a processor coupled to the memory configured to execute the stored executable instructions to:
receive a social suggestion indication comprising an event suggestion request from a first user of the social networking site;
determine an event associated with the first user, the event having a location and time;
access the data structure to determine the plurality of user models including a first user model corresponding with the first user;
compare the event with the plurality of user models to determine multiple user models including a second user model from the plurality of user models, based on a predetermined criteria;
determine the second user model from the determined multiple user models based on social affinity between the first user model corresponding with the first user and the determined multiple user models;
identify a second user corresponding with the second user model; and
automatically generate, without user intervention by the first or second user, an attendee suggestion that the identified second user and the first user both attend the event;
send the attendee suggestion to the identified second user without notifying the first user; and
send the user suggestion to the first user only if the second user accepts the user suggestion.

11. The system of claim 10, wherein the comparing to determine multiple user models comprises determining the multiple user models having social information satisfying the predetermined criteria based on the event.

12. The system of claim 10, wherein:
the social information comprises user profile information; and
the determining the second user model from the determined multiple user models based on social affinity comprises determining the second user model based on shared profile information between the first and the determined multiple user models.

13. The system of claim 10, wherein:
the determining the event comprises determining the event from the social suggestion indication; and
the comparing to determine the multiple user models comprises comparing the event and the first user model with the plurality of user models, to determine the multiple user models.

14. The system of claim 10, wherein:
the social suggestion indication comprises an event suggestion request; and
the determining the event comprises determining, in response to the event suggestion request, the event based on the first user model.

15. The system of claim 10, wherein:
the social suggestion indication comprises an event suggestion request;
the processor is further configured to access the data structure to determine a third user model associated with a third user, the third user associated with the social networking site and socially related to the first user; and
the determining the event comprises determining, in response to the event suggestion request, the event based on the third user model.

16. The system of claim 10, wherein the processor is further configured to:
receive an accept input from the first user in response to the attendee suggestion; and
communicate the acceptance of the attendee suggestion by the first user to the second user.

17. A machine-readable storage medium comprising machine-readable instructions for causing a processor to execute a method for suggesting an attendee to an event within a social networking site, the method comprising:
receiving a social suggestion indication comprising an event suggestion request from a first user of the social networking site;
determining an event associated with the first user, the event having a location and time;
accessing a data structure storing a plurality of user models, each user model corresponding to a user, including a first user model corresponding with the first user, wherein the plurality of user models comprises social information of users including profile information;
comparing the event and the first user model with the plurality of user models to determine, from the plurality of user models, multiple user models including a second user model having social information satisfying a predetermined criteria;
determining the second user model, from the determined multiple user models, having social affinity between the first user model corresponding with the first user and the determined multiple user models based on shared profile information between the first user model and the determined multiple user models;
identifying a second user corresponding with the second user model; and
automatically generating, without user intervention by the first or second user, a user suggestion that the first user and the identified second user both attend the event;
sending the user suggestion to the identified second user without notifying the first user; and
sending the user suggestion to the first user only if the second user accepts the user suggestion.

18. The machine-readable storage medium of claim 17, wherein the social suggestion indication comprises an event suggestion request, wherein the determining the event comprises determining, in response to the event suggestion request, the event based on the first user model.

* * * * *